United States Patent
Ashida

(10) Patent No.: US 10,483,882 B2
(45) Date of Patent: Nov. 19, 2019

(54) DRIVE DEVICE

(71) Applicant: Toyota Jidosha Kabushiki Kaisha, Toyota-shi, Aichi-ken (JP)

(72) Inventor: Shinjiro Ashida, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/019,001

(22) Filed: Jun. 26, 2018

(65) Prior Publication Data
US 2019/0089275 A1 Mar. 21, 2019

(30) Foreign Application Priority Data
Sep. 19, 2017 (JP) ................. 2017-178827

(51) Int. Cl.
| | |
|---|---|
| H02P 23/12 | (2006.01) |
| H02P 6/15 | (2016.01) |
| B60L 50/50 | (2019.01) |
| B60L 15/20 | (2006.01) |
| H02P 6/16 | (2016.01) |

(52) U.S. Cl.
CPC ............. *H02P 6/15* (2016.02); *B60L 15/20* (2013.01); *B60L 50/50* (2019.02); *H02P 6/16* (2013.01)

(58) Field of Classification Search
CPC ...................................... H02P 6/15; H02P 6/16
See application file for complete search history.

(56) References Cited

U.S. PATENT DOCUMENTS

| | | | |
|---|---|---|---|
| 2015/0073745 A1 | 3/2015 | Mizuno et al. | |
| 2018/0342972 A1* | 11/2018 | Yamamoto | H03M 1/1076 |

FOREIGN PATENT DOCUMENTS

| | | |
|---|---|---|
| JP | 2008-196937 A | 8/2008 |
| JP | 2014-224731 A | 12/2014 |
| JP | 2015-055567 A | 3/2015 |

\* cited by examiner

*Primary Examiner* — Karen Masih
(74) *Attorney, Agent, or Firm* — Dinsmore & Shohl LLP

(57) ABSTRACT

A drive device includes a motor, an inverter, and a rotation angle detector. The rotation angle detector includes a resolver and an electronic control unit. The electronic control unit converts a signal from the resolver to a master rotation angle of the motor. The electronic control unit converts a signal obtained by attenuating a high frequency component of a frequency higher than a predetermined frequency with respect to the signal from the resolver to a slave rotation angle of the motor. The electronic control unit determines that the master rotation angle is normal when a determination condition that a difference between the master rotation angle and the slave rotation angle is equal to or greater than a first threshold and a temporal variation as a variation of the master rotation angle per unit time is equal to or greater than a second threshold is not established.

6 Claims, 10 Drawing Sheets

DRIVE DEVICE

CROSS-REFERENCE TO RELATED APPLICATIONS

This application claims priority to Japanese Patent Application No. 2017-178827 filed on Sep. 19, 2017, which is incorporated herein by reference in its entirety including the specification, drawings and abstract.

BACKGROUND

1. Technical Field

The present disclosure relates to a drive device, and in particular, to a drive device including a motor, an inverter, and a rotation angle detector.

2. Description of Related Art

As a drive device of the related art, a drive device that includes a rotation angle detection device having a master system resolver/digital conversion unit configured to convert an analog output signal from a resolver attached to a rotational shaft of a motor to a master system rotation angle signal, a slave system A/D conversion unit configured to convert the analog output signal to slave system sine signal and cosine signal, a slave system rotation angle conversion unit configured to convert the slave system sine signal and cosine signal to a slave system rotation angle signal, and a rotation angle filter out configured to convert the slave system rotation angle signal to a filtered rotation angle signal by excluding a specific frequency with respect to the slave system rotation angle signal has been suggested (for example, see Japanese Unexamined Patent Application Publication No. 2014-224731 (JP 2014-224731 A)). In the drive device, the master system rotation angle signal and the filtered rotation angle signal are compared to perform abnormality diagnosis of the master system resolver/digital conversion unit.

SUMMARY

In the above-described drive device, noise due to switching of a plurality of switching elements of an inverter configured to drive the motor may be superimposed on the analog output signal from the resolver, and both of the master system rotation angle signal (master rotation angle) and the filtered rotation angle signal (slave rotation angle) may be disturbed. In this case, even though the master system rotation angle signal and the filtered rotation angle signal are compared, and it may not be possible to appropriately determine whether or not the master system rotation angle signal is normal.

The present disclosure provides a drive device that more appropriately performs diagnosis about whether or not a master rotation angle of a motor is normal.

An aspect of the present disclosure relates to a drive device. The drive device includes a motor, an inverter configured to drive the motor with switching of a plurality of switching elements, and a rotation angle detector configured to detect a rotation angle of the motor. The rotation angle detector includes a resolver and an electronic control unit. The resolver is attached to a rotational shaft of the motor and is configured to output a signal according to rotation of the motor. The electronic control unit is configured to convert a signal from the resolver to a master rotation angle of the motor. The electronic control unit is configured to convert a signal obtained by attenuating a high frequency component of a frequency higher than a predetermined frequency with respect to the signal from the resolver to a slave rotation angle of the motor. The electronic control unit is configured to determine that the master rotation angle is normal when a determination condition that a difference between the master rotation angle and the slave rotation angle is equal to or greater than a first threshold and a temporal variation as a variation of the master rotation angle per unit time is equal to or greater than a second threshold is not established, and determine that the master rotation angle is abnormal when the determination condition is established.

According to the aspect of the present disclosure, the rotation angle detector that detects the rotation angle of the motor converts the signal from the resolver to the master rotation angle of the motor with the electronic control unit and converts the signal obtained by attenuating the high frequency component of the frequency higher than the predetermined frequency with respect to the signal from the resolver to the slave rotation angle of the motor with the electronic control unit. The rotation angle detector determines, with the electronic control unit, that the master rotation angle is normal when the determination condition that the difference between the master rotation angle and the slave rotation angle is equal to or greater than the first threshold and the temporal variation as the variation of the master rotation angle per unit time is equal to or greater than the second threshold is not established, and determines, with the electronic control unit, that the master rotation angle is abnormal when the determination condition is established. With this, it is possible to more appropriately perform diagnosis compared to a case where diagnosis about whether or not the master rotation angle is normal is performed using solely the difference between the master rotation angle and the slave rotation angle of the motor. Here, as a case where the master rotation angle of the motor is abnormal, at least a case where noise due to switching of the switching elements of the inverter is superimposed on at least the master rotation angle (on solely the master rotation angle or both of the master rotation angle and the slave rotation angle), or a case where an abnormality occurs in converting the signal from the resolver to the master rotation angle of the motor can be exemplified. As a case where noise is superimposed on the master rotation angle and the slave rotation angle of the motor, a case where noise is superimposed on the signal from the resolver, and then, noise is superimposed on the master rotation angle and the slave rotation angle can be considered.

In the drive device according to the aspect of the present disclosure, the electronic control unit may be configured to determine that the determination condition is established when a proportion of a state in which the difference is equal to or greater than the first threshold and the temporal variation is equal to or greater than the second threshold is equal to or greater than a third threshold for a predetermined time, and determine that the master rotation angle is abnormal. With this, it is possible to further suppress erroneous diagnosis about whether or not the master rotation angle of the motor is normal compared to a case where determination is made that the master rotation angle of the motor is abnormal when the state in which the difference is equal to or greater than the first threshold and the temporal variation is equal to or greater than the second threshold is brought solely once.

In the drive device according to the aspect of the present disclosure, the electronic control unit may be configured to convert the signal from the resolver to the master rotation angle using a first gain. The electronic control unit may be configured to convert the signal from the resolver to the slave rotation angle using a second gain smaller than the first gain. With this, the second gain is set to be a value smaller than the first gain, whereby it is possible to convert the signal obtained by attenuating the high frequency component with respect to the signal from the resolver to the slave rotation angle of the motor.

In the drive device according to the aspect of the present disclosure, the electronic control unit may be configured to convert the signal from the resolver to the master rotation angle using a predetermined gain. The electronic control unit may be configured to perform filter processing for attenuating the high frequency component with respect to the signal from the resolver to generate a filtered signal. The electronic control unit may be configured to convert the filtered signal to the slave rotation angle using the predetermined gain. With this, it is possible to convert the signal obtained by attenuating high frequency component with respect to the signal from the resolver to the slave rotation angle of the motor.

In the drive device according to the aspect of the present disclosure, the electronic control unit may be configured to convert the signal from the resolver to the master rotation angle using a predetermined gain. The electronic control unit may be configured to perform filter processing for attenuating the high frequency component with respect to the master rotation angle to generate the slave rotation angle. With this, it is possible to convert the signal obtained by attenuating the high frequency component with respect to the signal from the resolver to the slave rotation angle of the motor. As a result, it is possible to achieve further simplification of a configuration or reduction in cost.

In the drive device according to the aspect of the present disclosure, the electronic control unit may be configured to control the inverter using the master rotation angle in a case where the electronic control unit determines that the master rotation angle is normal, and control the inverter using the slave rotation angle in a case where the electronic control unit determines that the master rotation angle is abnormal. With this, even when the master rotation angle of the motor is abnormal, it is possible to control the inverter using the slave rotation angle of the motor.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

A mode for carrying out the present disclosure will be described in connection with an example.

Figure 1:
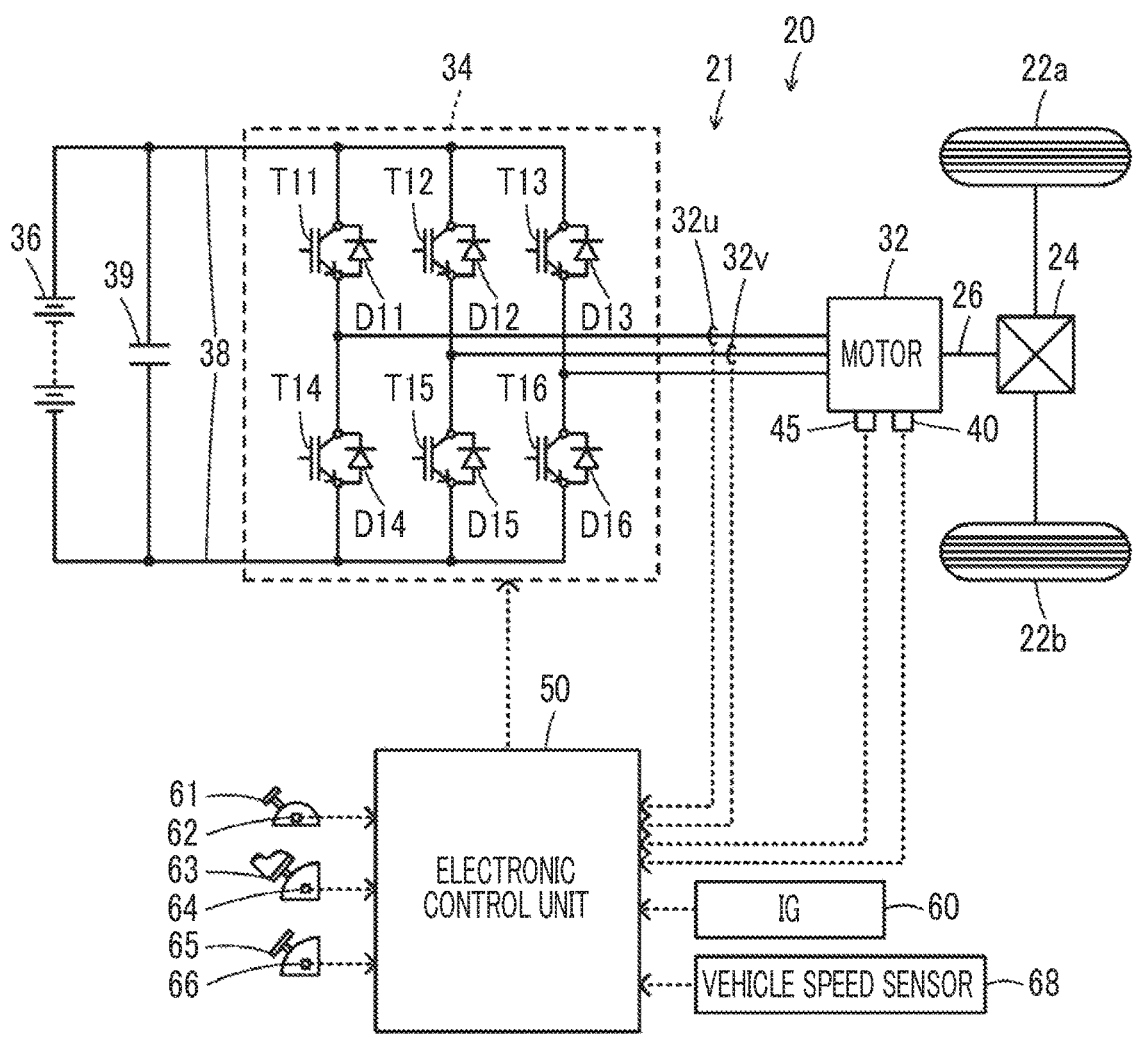
FIG. 1 is a configuration diagram showing the outline of the configuration of an electric vehicle in which a drive device as an example of the present disclosure is mounted.
Figure 2:
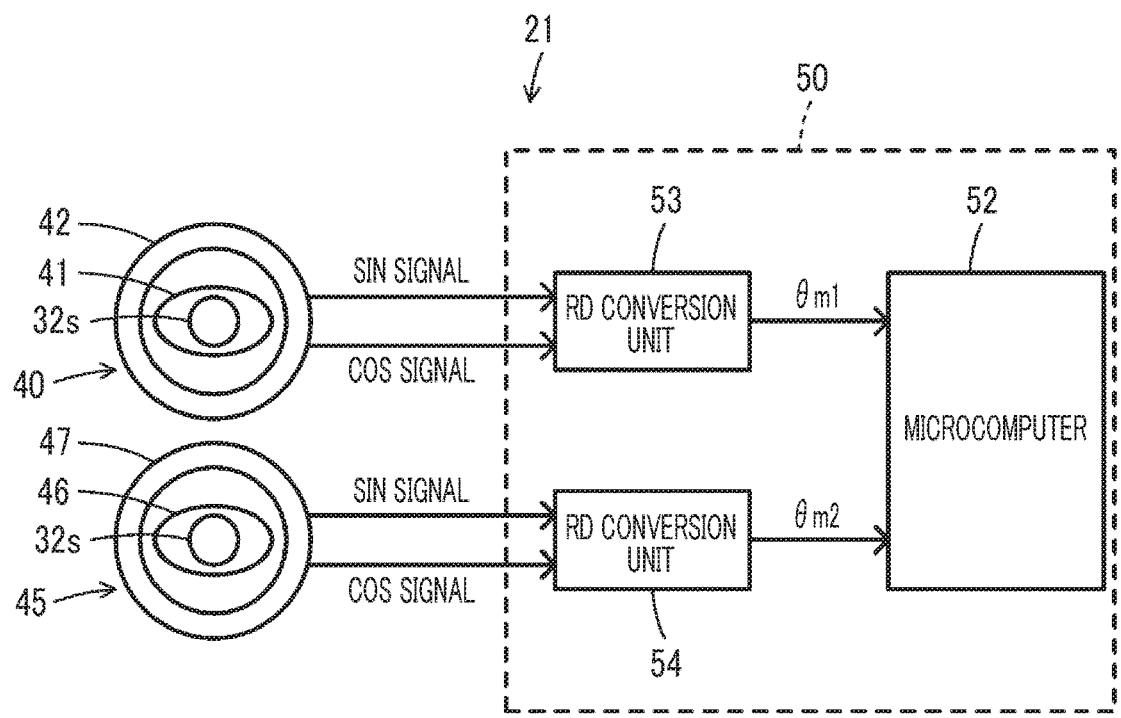
FIG. 2 is a configuration diagram showing the outline of the configuration of a part of the drive device.

FIG. 1 is a configuration diagram showing the outline of the configuration of an electric vehicle 20 in which a drive device 21 as an example of the present disclosure is mounted. FIG. 2 is a configuration diagram showing the outline of the configuration of a part of the drive device 21. As shown in the drawing, the electric vehicle 20 of the example includes a motor 32, an inverter 34, a battery 36 as an electric power storage device, and an electronic control unit 50.

The motor 32 is constituted as a synchronous motor generator. The motor 32 includes a rotor (not shown) embedded with a permanent magnet and attached to a rotational shaft 32s, and a stator (not shown) wound with three-phase coils. The rotational shaft 32s of the motor 32 is connected to a drive shaft 26 coupled to drive wheels 22a, 22b through a differential gear 24. Resolvers 40, 45 are attached to the rotational shaft 32s of the motor 32. The resolvers 40, 45 are constituted identical to each other. As shown in FIG. 2, the resolvers 40, 45 includes rotors 41, 46 as a magnetic body rotating integrally with the rotational shaft 32s of the motor 32, and stators 42, 47. The stators 42, 47 are a magnetic body embedded with an excitation coil, to which an alternating current of a given frequency is applied as an excitation signal from an oscillation circuit (not shown), or two output coils disposed to be electrically shifted by 90 degrees (such that a phase difference becomes 90 degrees). Output signals of the two output coils are signals that are generated accompanied with changes in gaps between the rotors 41, 46 and the stators 42, 47 caused by rotation of the rotors 41, 46 having an elliptical shape. The output signals of the two output coils are signals (hereinafter, referred to as a "SIN signal" and a "COS signal", respectively) that become a sine wave shape and a cosine wave shape, respectively, when a peak value is complemented. In a case where the excitation signal input to the resolvers 40, 45 is "$A \cdot \sin(\omega \cdot t)$", the SIN signal and the COS signal from the resolvers 40, 45 become "$K \cdot A \cdot \sin(\omega \cdot t) \cdot \sin(\theta m)$" and "$K \cdot A \cdot \sin(\omega \cdot t) \cdot \cos(\theta m)$". "A" is amplitude of the excitation signal, "$\omega$" is a frequency of the excitation signal, "t" is time, "K" is a transformation ratio of the resolvers 40, 45, and "θm" is an actual rotation angle of the motor 32.

The inverter 34 is used for driving of the motor 32, and is connected to the battery 36 through an electric power line 38. The inverter 34 has six transistors T11 to T16 as switching elements, and six diodes D11 to D16 connected in parallel with the six transistors T11 to T16, respectively. The transistors T11 to T16 are disposed in pairs so as to become a source side and a sink side with respect to a positive electrode side line and a negative electrode side line of the electric power line 38. The three-phase coils (U-phase, V-phase, and W-phase) of the motor 32 are connected to connection points between the paired transistors or the transistors T11 to T16, respectively. Accordingly, when a voltage is applied to the inverter 34, the ratio of the on time of the paired transistors of the transistors T11 to T16 is adjusted by the electronic control unit 50. With this, a rotating magnetic field is formed in the three-phase coils, and the motor 32 is rotationally driven. Current sensors 32u, 32v are attached to the U-phase and V-phase electric power lines 38 that connect the motor 32 and the inverter 34.

The battery 36 is constituted as, for example, a lithium-ion secondary battery or a nickel-hydrogen secondary battery. As described above, the battery 36 is connected to the inverter 34 through the electric power line 38. A capacitor 39 is attached to the positive electrode side line and the negative electrode side line of the electric power line 38.

The electronic control unit 50 includes a microcomputer 52, first resolver/digital conversion unit and second resolver/digital conversion unit (hereinafter, referred to as "RD conversion units") 53, 54, and the like. The RD conversion units 53, 54 receive the output signals (SIN signal and COS signal) from the resolvers 40, 45 as input, convert the output signals to a master rotation angle θm1 and a slave rotation angle θm2 as an electric angle, respectively, and output the master rotation angle θm1 and the slave rotation angle θm2 to the microcomputer 52.

The RD conversion unit 53 includes a first multiplier, a second multiplier, an adder, a compensator (amplifier), and a counter. The first multiplier multiplies K·A·sin(ω·t)·sin(θm)" as the SIN signal from the resolver 40 by "cos(θm1)" to obtain "K·A·sin(ω·t)·sin(θm)·cos(θm1)". The second multiplier multiplies "K·A·sin(ω·t)·cos(θm)" as the COS signal from the resolver 40 by "sin(θm1)" to obtain "K·A·sin (ω·t)·cos(θm)·sin(θm1)". In the adder, "K·A·sin(ω·t)·sin (θm−θm1)" is obtained as the difference between the "K·A·sin(ω·t)·sin(θm)·cos(θm1)" and the "K·A·sin(ω·t)·cos (θm)·sin(θm1)". The compensator obtains the master rotation angle θm1 using "K·A·sin(ω·t)·sin(θm−θm1)" from the adder and a transfer function "Kv·(1+1/(Ti·s))" such that "K·A·sin(ω·t)·sin(θm−m1)" becomes a value of zero. The counter outputs the master rotation angle θm1 from the compensator to the microcomputer 52, the first multiplier, and the second multiplier. "Kv" is a proportional gain, "Ti" is an integral time constant, and "s" is a Laplace operator. The RD conversion unit 54 is constituted identical to the RD conversion unit 53 except that the value of the proportional gain Kv is different, the SIN signal and the COS signal from the resolver 45 are input instead of the SIN signal and the COS signal from the resolver 40, and the slave rotation angle θm2 is output instead of the master rotation angle θm1.

As the proportional gain Kv of the RD conversion unit 53, a value Kv1 that is large to a certain extent is used. As the proportional gain Kv of the RD conversion unit 54, a value Kv2 that is smaller than the value Kv1 is used. Accordingly, the RD conversion unit 54 obtains the slave rotation angle θm2 the motor 32 by attenuating a predetermined high frequency component (a frequency component higher than a predetermined frequency) with respect to the signal from the resolver 45 compared to the RD conversion unit 53. The slave rotation angle θm2 of the motor 32 obtained in the above-described manner has lower followability to the output signals from the resolvers 40, 45 than the master rotation angle θm1 of the motor 32. As a case where changes in the signals from the resolvers 40, 45 become relatively fast, for example, a case where rotation fluctuation of the motor 32 is relatively large or a case where noise due to switching of the transistors T11 to T16 of the inverter 34 is superimposed on the signals from the resolvers 40, 45 can be considered.

The microcomputer 52 has a central processing unit (CPU), a read only memory (ROM), a random access memory (RAM), and an input/output port. Signals from various sensors are input to the electronic control unit 50 through the input port. As the signals that are input to the electronic control unit 50, for example, the master rotation angle θm1 and the slave rotation angle θm2 of the motor 32 from the RD conversion units 53, 54, and U-phase and V-phase phase currents Iu, Iv of the motor 32 from the current sensors 32u, 32v can be exemplified. An ignition signal from an ignition switch 60, and a shift position SP from a shift position sensor 62 that detects an operation position of a shift lever 61 can also be exemplified. An accelerator operation amount Acc from an accelerator pedal position sensor 64 that detects a depression amount of an accelerator pedal 63, a brake pedal position BP from a brake pedal position sensor 66 that detects a depression amount of a brake pedal 65, and a vehicle speed V from a vehicle speed sensor 68 can also be exemplified. A switching control signal to the transistors T11 to T16 of the inverter 34, or the like is output from the electronic control unit 50 through the output port.

In the electric vehicle 20 of the example configured as above, the electronic control unit 50 sets requested torque Td* requested for the drive shaft 26 based on the accelerator operation amount Acc and the vehicle speed V, and sets the requested torque Td* to a torque command Tm* of the motor 32. The electronic control unit 50 controls the transistors T11 to T16 of the inverter 34 using the torque command Tm* of the motor 32 through pulse width modulation control (PWM control). Here, the PWM control is control for adjusting the ratio of the on time of the transistors T11 to T16 by comparison of a voltage command of the motor 32 and a carrier wave (triangular wave) voltage.

Figure 3:
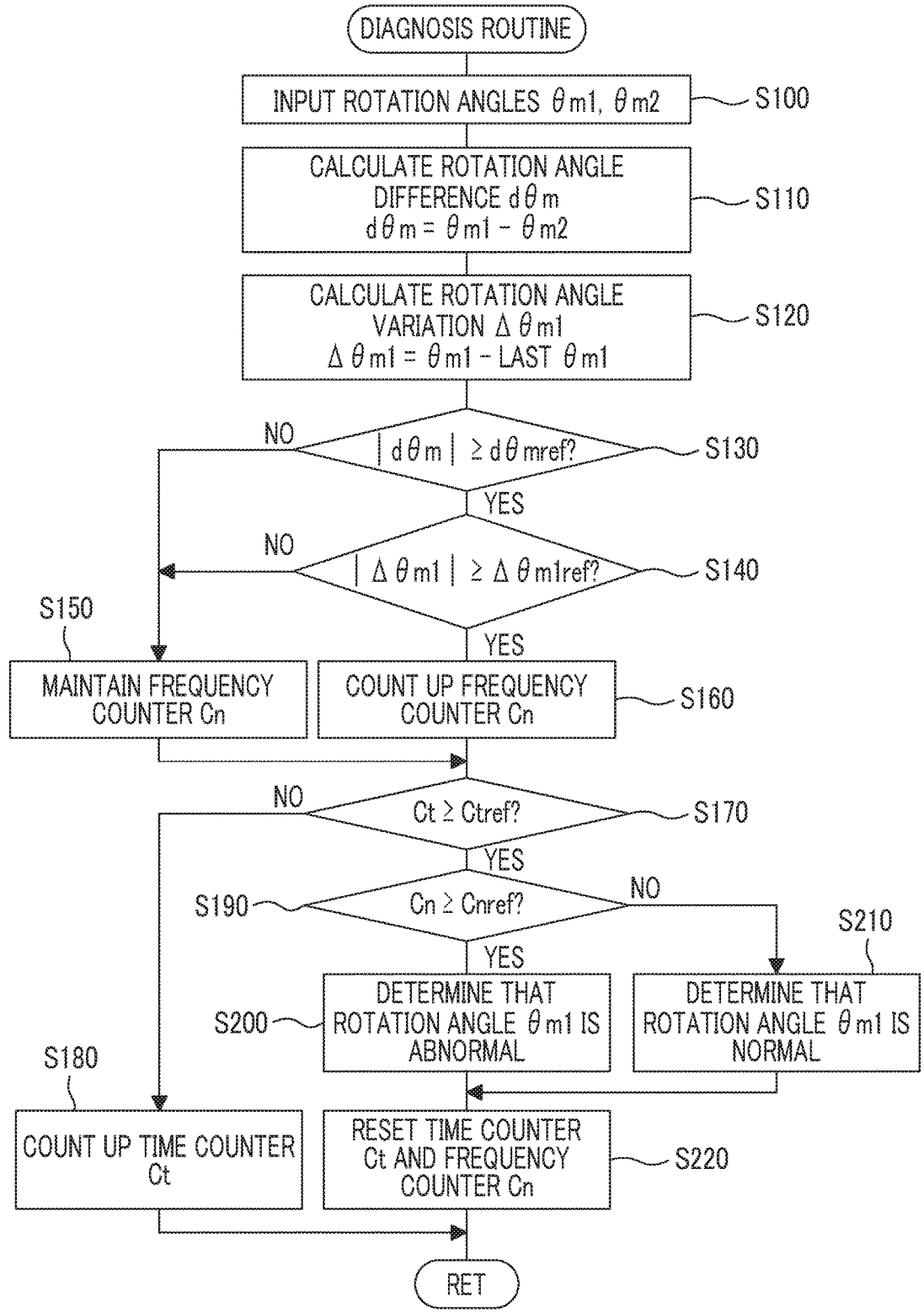
FIG. 3 is a flowchart showing an example of a diagnosis routine that is executed by an electronic control unit.

The operation of the electric vehicle 20 of the example configured as above, and in particular, an operation in diagnosing whether or not the master rotation angle θm1 of the motor 32 is normal will be described. FIG. 3 is a flowchart showing an example of a diagnosis routine that is executed by the electronic control unit 50. The diagnosis routine of FIG. 3 is executed repeatedly at an interval of, for example, 0.8 msec, 1 msec, or 1.2 msec.

In a case where the diagnosis routine of FIG. 3 is executed, the electronic control unit 50 receives the master rotation angle θm1 and the slave rotation angle θm2 of the motor 32 from the RD conversion units 53, 54 as input (Step S100). The electronic control unit 50 subtracts the slave rotation angle θm2 from the master rotation angle θm1 of the motor 32 to calculate a rotation angle difference dθm as the difference between the master rotation angle θm1 and the slave rotation angle θm2 (Step S110). The electronic control unit 50 subtracts a lost rotation angle (last θm1) from a present master rotation angle θm1 of the motor 32 to calculate a rotation angle variation Δθm1 as a variation of the master rotation angle θm1 per unit time (per execution interval of the routine) (Step S120).

Subsequently, the electronic control unit 50 compares an absolute value of the rotation angle difference dθm of the motor 32 with a threshold dθmref (Step S130). The electronic control unit 50 compares an absolute value of the rotation angle variation Δθm1 of the motor 32 with a threshold Δθm1ref (Step S140). Here, the threshold dθmref and the threshold Δθm1ref are thresholds that are used in diagnosing whether or not the master rotation angle θm1 of the motor 32 is normal. The threshold dθmref is determined as a value that is greater than a tolerance (a manufacturing error, a detection error, or the like, and for example, several deg or the like) of the resolvers 40, 45 and can be given to drive control of the motor 32. For the threshold dθmref, for example, 8 deg, 10 deg, 12 deg, or the like can be used. The threshold Δθm1ref is determined as the rotation angle variation Δθm1 (a rotation angle variation per execution interval of the routine) of the motor 32 that is not assumed in usual. For the threshold Δθm1ref, for example, 50 deg, 60 deg, 70 deg, or the like can be used.

In Step S130, when the absolute value of the rotation angle difference dθm of the motor 32 is less than the threshold dθmref, or in Step S140, when the absolute value of the rotation angle variation Δθm1 of the motor 32 is less than the threshold Δθm1ref, a frequency counter Cn is maintained (Step S150). In Steps S130 and S140, when the absolute value of the rotation angle difference dθm of the motor 32 is equal to or greater than the threshold dθmref and the absolute value of the rotation angle variation Δθm1 of the motor 32 is equal to or greater than the threshold Δθm1ref, the frequency counter Cn is counted up by a value of one (Step S160). In the frequency counter Cn, a value of zero as an initial value when ignition is on is set.

Subsequently, a time counter Ct is compared with a threshold Ctref (Step S170). When the time counter Ct is less than the threshold Ctref, the time counter Ct is counted up by a value of one (Step S180), and the routine ends. Here, in the time counter Ct, a value of zero as an initial value when ignition is on is set. The threshold Ctref is determined as a time interval of performing diagnosis about whether or not the master rotation angle θm1 of the motor 32 is normal. For the threshold Ctref, for example, a value corresponding to 40 msec, 50 msec, 60 msec, or the like can be used.

In Step S170, when the time counter Ct is equal to or greater than the threshold Ctref, the frequency counter Cn is compared with a threshold Cnref (Step S190). When the frequency counter Cn is less than the threshold Cnref, determination is made whether or not the master rotation angle θm1 (the master rotation angle θm1 of the RD conversion unit 53) of the motor 32 is normal (Step S210). The time counter Ct and the frequency counter Cn are reset to the value of zero (Step S220), and the routine ends. Here, for the threshold Cnref, a value corresponding to 40%, 50%, 60%, or the like of the threshold Ctref can be used.

In this way, in a case where determination is made that the master rotation angle θm1 of the motor 32 is normal, the transistors T11 to T16 of the inverter 34 are subjected to switching control using the plaster rotation angle θm1 of the motor 32 through pulse width modulation control (PWM control). Specifically, assuming that the total sum of the phase currents Iu, Iv, Iw of the phases (U-phase, V-phase, and W-phase) of the motor 32 is a value of zero, the phase currents Iu, Iv of the U-phase and the V-phase are coordinate-converted (three-phase to two-phase conversion) to currents Id, Iq of the d-axis and the q-axis using the master rotation angle θm1 of the motor 32. Current commands Id*, Iq* of the d-axis and the q-axis are set based on the torque command Tm* of the motor 32. Voltage commands Vd*, Vq* of the d-axis and the q-axis are set using, the current commands Id*, Iq* and the currents Id, Iq of the d-axis and the q-axis. Subsequently, the voltage commands Vd*, Vq* of the d-axis and the q-axis are coordinate-converted (two-phase to three-phase conversion) to the voltage commands Vu*, Vv*, Vw* of the phases using the master rotation angle θm1 of the motor 32. A PWM signal of the transistors T11 to T16 is generated by comparison of the voltage commands Vu*, Vv*, Vw* of the phases and the carrier wave. Switching of the transistors T11 to T16 is performed using the PWM signal of the transistors T11 to T16.

When the frequency counter Cn is equal to or greater than the threshold Cnref, determination is made that the master rotation angle θm1 of the motor 32 is abnormal (Step S200). The time counter Ct and the frequency counter Cn are reset to the value of zero (Step S220), and the routine ends. Here, as a case where the master rotation angle θm1 of the motor 32 is abnormal, at least a case where noise due to switching of the transistors T11 to T16 of the inverter 34 is superimposed on the master rotation angle θm1 of the motor 32 (on solely the master rotation angle θm1 or both of the master rotation angle θm1 and the slave rotation angle θm2), or a case where an abnormality occurs in the RD conversion unit 53 can be exemplified. In the example, as a case where noise is superimposed on the master rotation angle θm1 or the slave rotation angle θm2 of the motor 32, a case where noise is superimposed on the output signals from the resolvers 40, 45, and then, noise is superimposed on the master rotation angle θm1 or the slave rotation angle θm2 is considered. As described above, the slave rotation angle θm2 of the motor 32 has lower followability to the output signals from the resolvers 40, 45 than the master rotation angle θm1 of the motor 32. For this reason, when noise is superimposed on both of the master rotation angle θm1 and the slave rotation angle θm2, fluctuation of the master rotation angle θm1 becomes greater than fluctuation of the slave rotation angle θm2.

In this way, in a case where determination is made that the master rotation angle θm1 of the motor 32 is abnormal, the transistors T11 to T16 of the inverter 34 are subjected to switching control using the slave rotation angle θm2, instead of the master rotation angle θm1 of the motor 32, through the PWM control. Then, when the master rotation angle θm1 of the motor 32 is abnormal, it is possible to control the inverter 34 using the slave rotation angle θm2 that has lower followability to rotation fluctuation of the motor 32 than the master rotation angle θm1 and is less influenced by noise.

Figure 4:
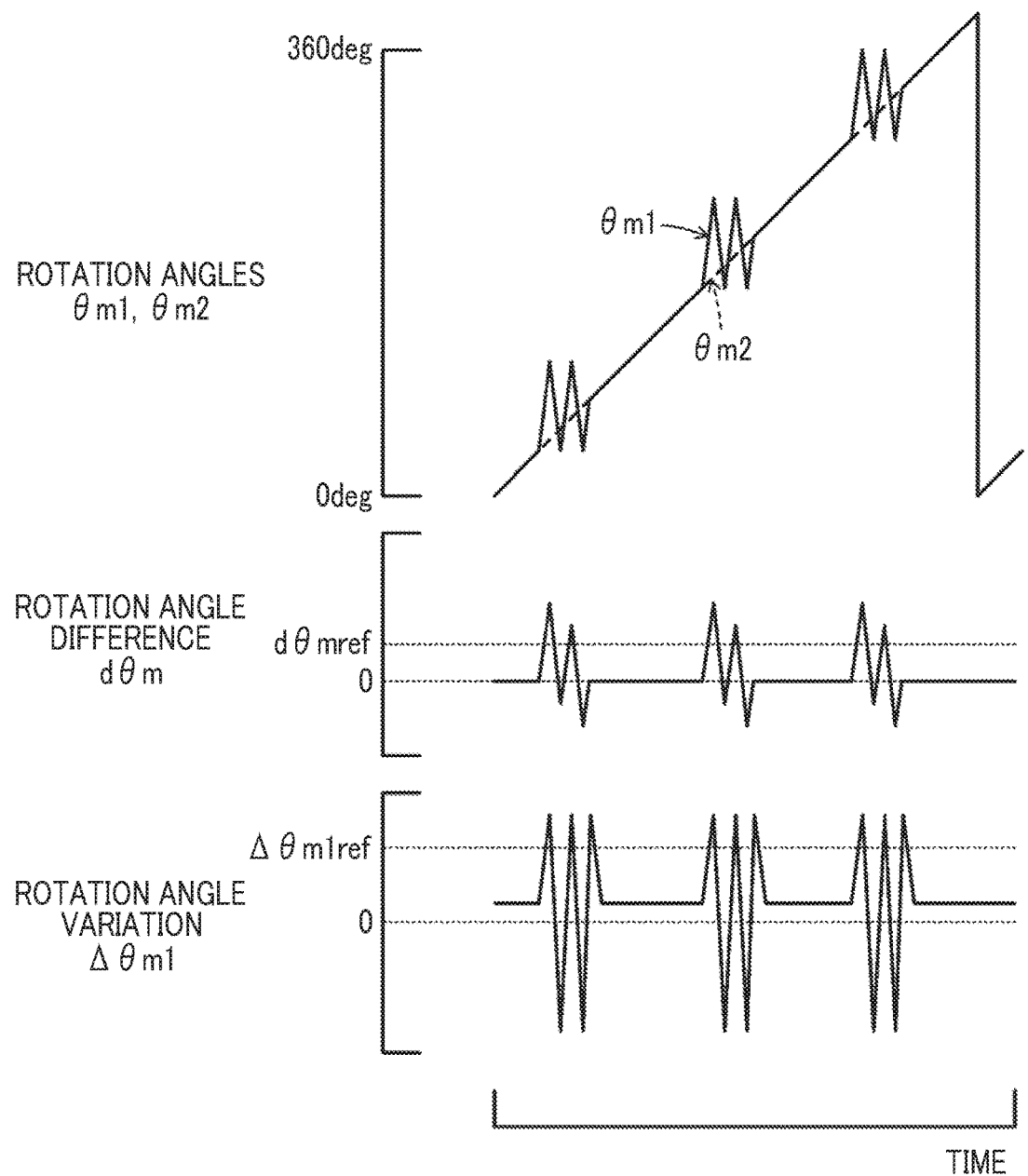
FIG. 4 is a graph showing a state when there is no rotation fluctuation of a motor and noise is superimposed on solely a master rotation angle of the motor.
Figure 5:
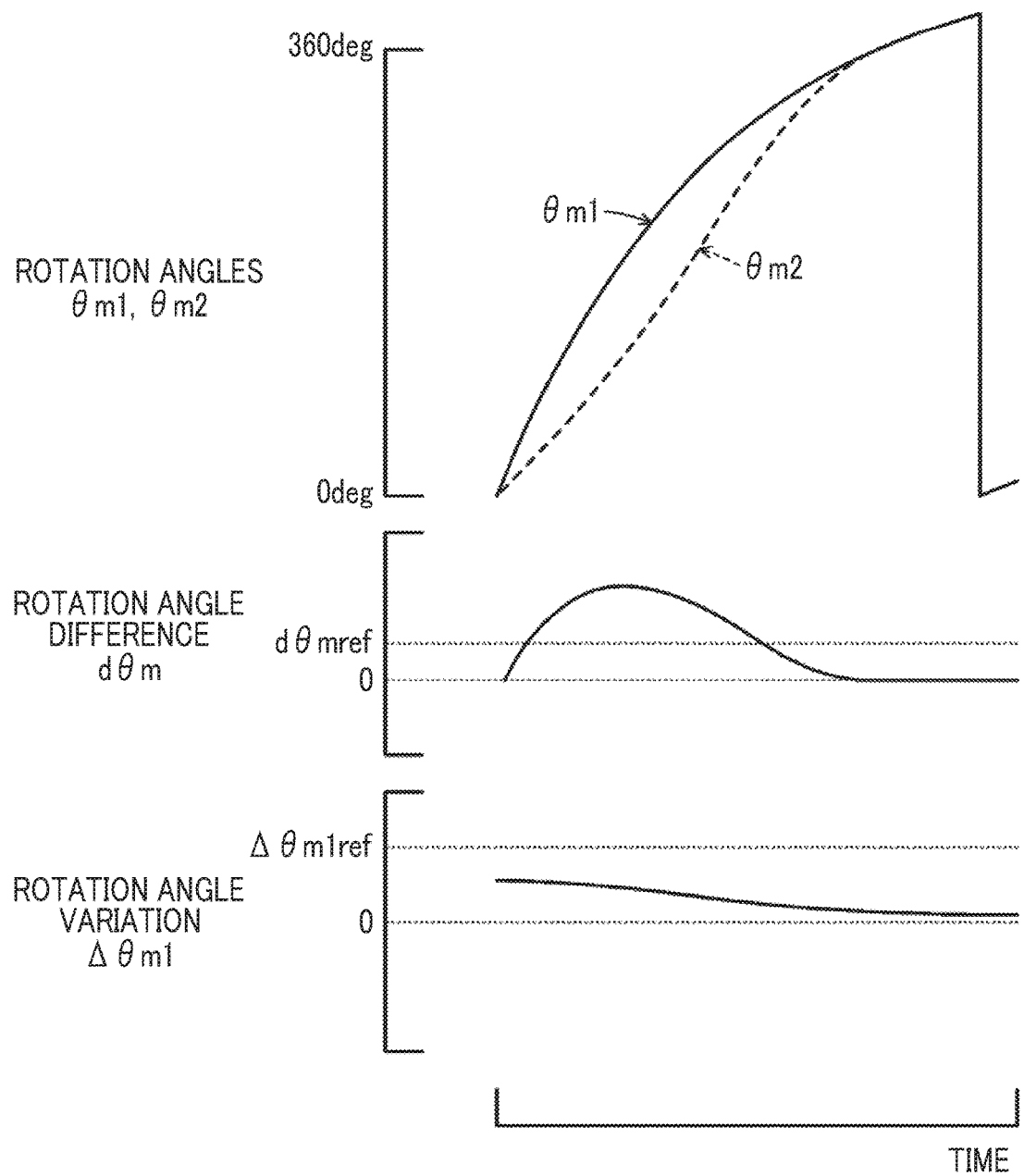
FIG. 5 is a graph showing a state when there is rotation fluctuation of the motor and noise is not superimposed on a master rotation angle and a slave rotation angle of the motor.

FIG. 4 is a graph showing a state when there is no rotation fluctuation of the motor 32 and noise is superimposed on solely the master rotation angle θm1 of the motor 32. FIG. 5 is a graph showing a state when there is rotation fluctuation of the motor 32 and noise is not superimposed on the master rotation angle θm1 and the slave rotation angle θm2 of the motor 32.

As shown in FIG. 4, when noise is superimposed on solely the master rotation angle θm1 of the motor 32, there is a case where the absolute value of the rotation angle difference dθm of the motor 32 becomes equal to or greater than the threshold dθmref and the absolute value of the rotation angle variation Δθm1 of the motor 32 becomes equal to or greater than the threshold Δθm1ref. Even when noise is superimposed on both of the master rotation angle θm1 and the slave rotation angle θm2 of the motor 32, the same idea as described above can be applied. Accordingly, a frequency of a state in which the absolute value of the rotation angle difference dθm of the motor 32 is equal to or greater than the threshold dθmref and the absolute value of the rotation angle variation Δθm1 of the motor 32 is equal to or greater than the threshold Δθm1ref is counted as the frequency counter Cn, and the frequency counter Cn is compared with the threshold Cnref at a predetermined time (a time corresponding to the threshold Ctref). With this, it is possible to diagnose whether or not the master rotation angle θm1 of the motor 32 is normal.

As shown in FIG. 5, when there is rotation fluctuation of the motor 32, even though noise is not superimposed on the master rotation angle θm1 of the motor 32, there is a case where the absolute value of the rotation angle difference dθm of the motor 32 becomes equal to or greater than the threshold dθmref. For this reason, in a case where diagnosis about whether or not the master rotation angle θm1 of the motor 32 is normal is performed using solely the rotation angle difference dθm of the motor 32, erroneous determination may be made that the master rotation angle θm1 is abnormal even though noise is not superimposed on the master rotation angle θm1 and the master rotation angle θm1 is normal. In contrast, in the example, since diagnosis about whether or not the master rotation angle θm1 of the motor 32 is normal using the rotation angle difference dθm and the rotation angle variation Δθm1 of the motor 32, it is possible to more appropriately perform diagnosis.

In the drive device 21 mounted in the electric vehicle 20 of the example described above, the frequency of the state in which the absolute value of the rotation angle difference dθm of the motor 32 is equal to or greater than the threshold dθmref and the absolute value of the rotation angle variation Δθm1 of the motor 32 is equal to or greater than the threshold Δθm1ref is counted as the frequency counter Cn. When the frequency counter Cn is less than the threshold Cnref at a predetermined time (a time corresponding to the threshold Ctref), determination is made that the master rotation angle θm1 of the motor 32 is normal, and when the frequency counter Cn is equal to or greater than the threshold Cnref, determination is made that the master rotation angle θm1 of the motor 32 is abnormal. With this, it is possible to more appropriately perform diagnosis compared to a case where diagnosis about whether or not the master rotation angle θm1 of the motor 32 is normal is performed using solely the rotation angle difference dθm of the motor 32. It is possible to further suppress erroneous diagnosis about whether or not the master rotation angle θm1 is normal compared to determination that the master rotation angle θm1 is abnormal when the state in which the absolute value of the rotation angle difference dθm of the motor 32 is equal to or greater than the threshold dθmref and the absolute value of the rotation angle variation Δθm1 of the motor 32 is equal to or greater than the threshold Δθm1ref is brought solely once.

In the drive device 21 mounted in the electric vehicle 20 of the example, diagnosis about whether or not the master rotation angle θm1 of the motor 32 is normal is performed by counting, as the frequency counter Cn, an establishment frequency of a determination condition that the absolute value of the rotation angle difference dθm of the motor 32 is equal to or greater than the threshold dθmref and the absolute value of the rotation angle variation Δθm1 of the motor 32 is equal to or greater than the threshold Δθm1ref, and comparing the frequency counter Cn with the threshold Cnref at a predetermined time (a time corresponding to the threshold Ctref). However, when the state in which the absolute value of the rotation angle difference dθm of the motor 32 is equal to or greater than the threshold dθmref and the absolute value of the rotation angle variation Δθm1 of the motor 32 is equal to or greater than the threshold Δθm1ref is brought, diagnosis may be performed immediately that the master rotation angle θm1 of the motor 32 is abnormal.

In the drive device 21 mounted in the electric vehicle 20 of the example, as shown in the configuration diagram of a part of the drive device 21 of FIG. 2, the electronic control unit 50 has the microcomputer 52 and the RD conversion units 53, 54. However, as shown in a configuration diagram of a part of a drive device 21B of FIG. 6, an electronic control unit 50B may further have a filter unit 56 in addition to the microcomputer 52 and the RD conversion units 53, 54. As shown in a configuration diagram of a drive device 21C of FIG. 7, an electronic control unit 50C may further have a filter unit 57 in addition to the microcomputer 52 and the RD conversion units 53, 54.

Figure 6:
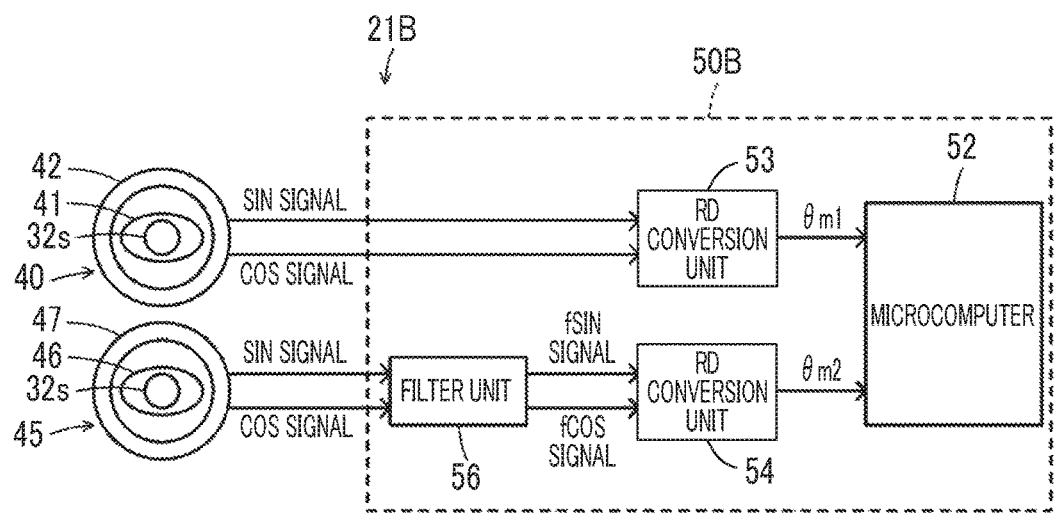
FIG. 6 is a configuration diagram showing the outline of the configuration of a part of a drive device of a modification example.

In the electronic control unit 50B of the drive device 21B of FIG. 6, the filter unit 56 subjects low-pass filter processing for attenuating a predetermined high frequency component (a frequency component higher than a predetermined frequency) to the signals (SIN signal and COS signal) from the resolver 45 to generate filtered signals (fSIN signal and fCOS signal) and outputs the filtered signals to the RD conversion unit 54. The RD conversion unit 54 converts the filtered signals (fSIN signal and fCOS signal) to the slave rotation angle θm2 and outputs the slave rotation angle θm2 to the microcomputer 52. In the electronic control unit 50B, the RD conversion units 53, 54 that are identical to each other (have the same proportional gain Kv as the value Kv1) are used. Even with the configuration of the electronic control unit 50B, the slave rotation angle θm2 of the motor 32 has lower followability to the output signals from the resolvers 40, 45 than the master rotation angle θm1 of the motor 32.

Figure 7:
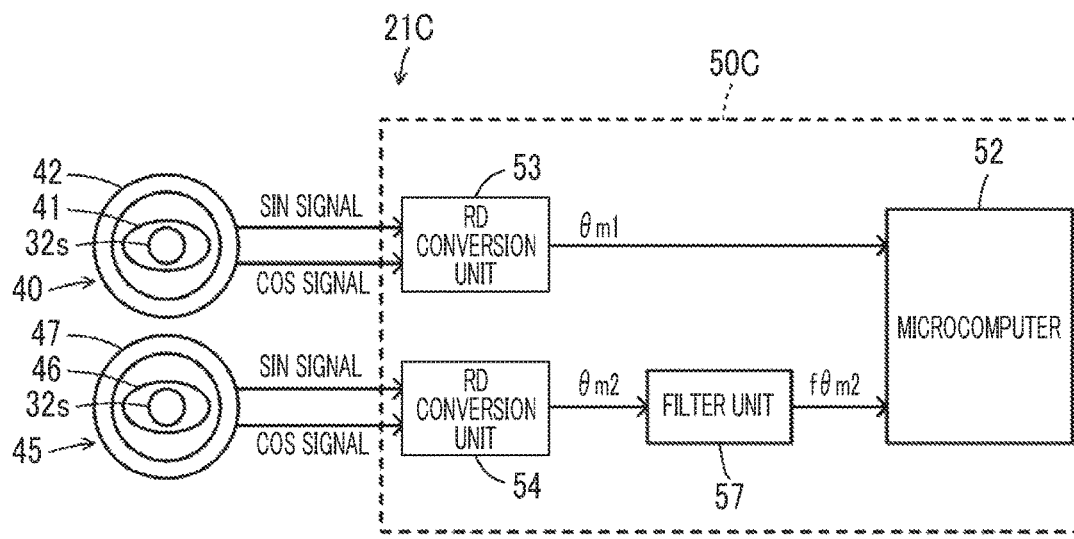
FIG. 7 is a configuration diagram showing the outline of the configuration of a part of a drive device of a modification example.
Figure 8:
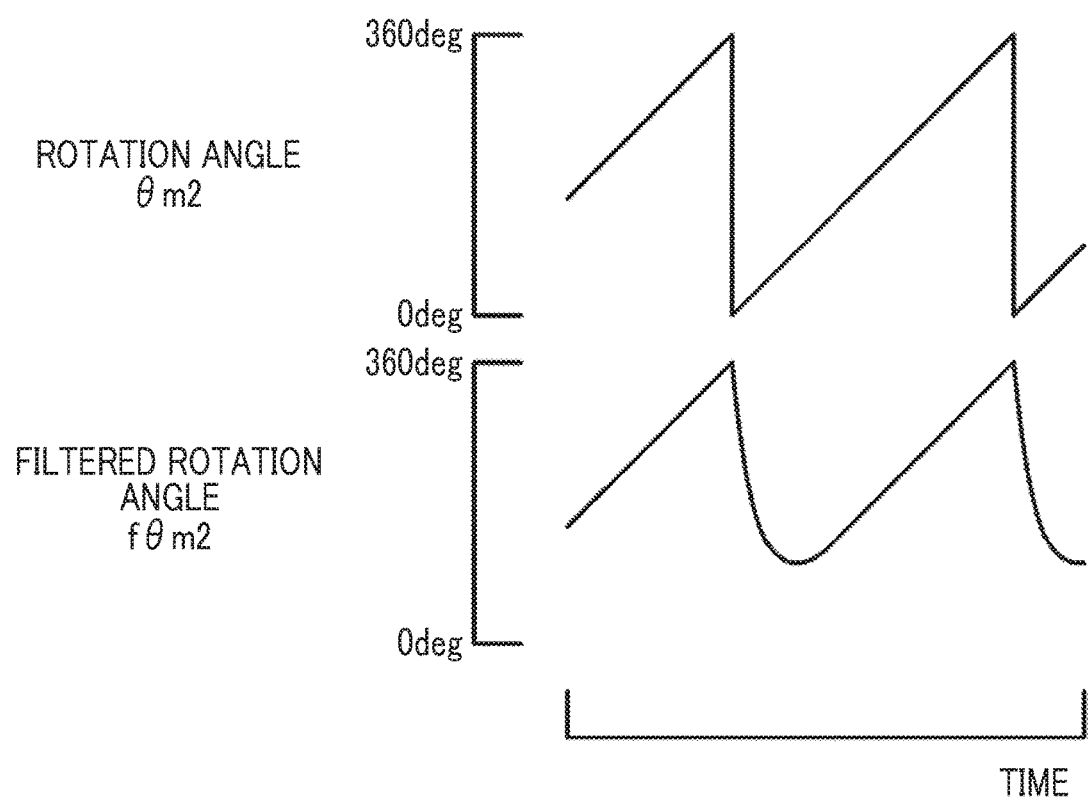
FIG. 8 is a graph showing a state in which a filtered rotation angle is generated in a comparative example.
Figure 9:
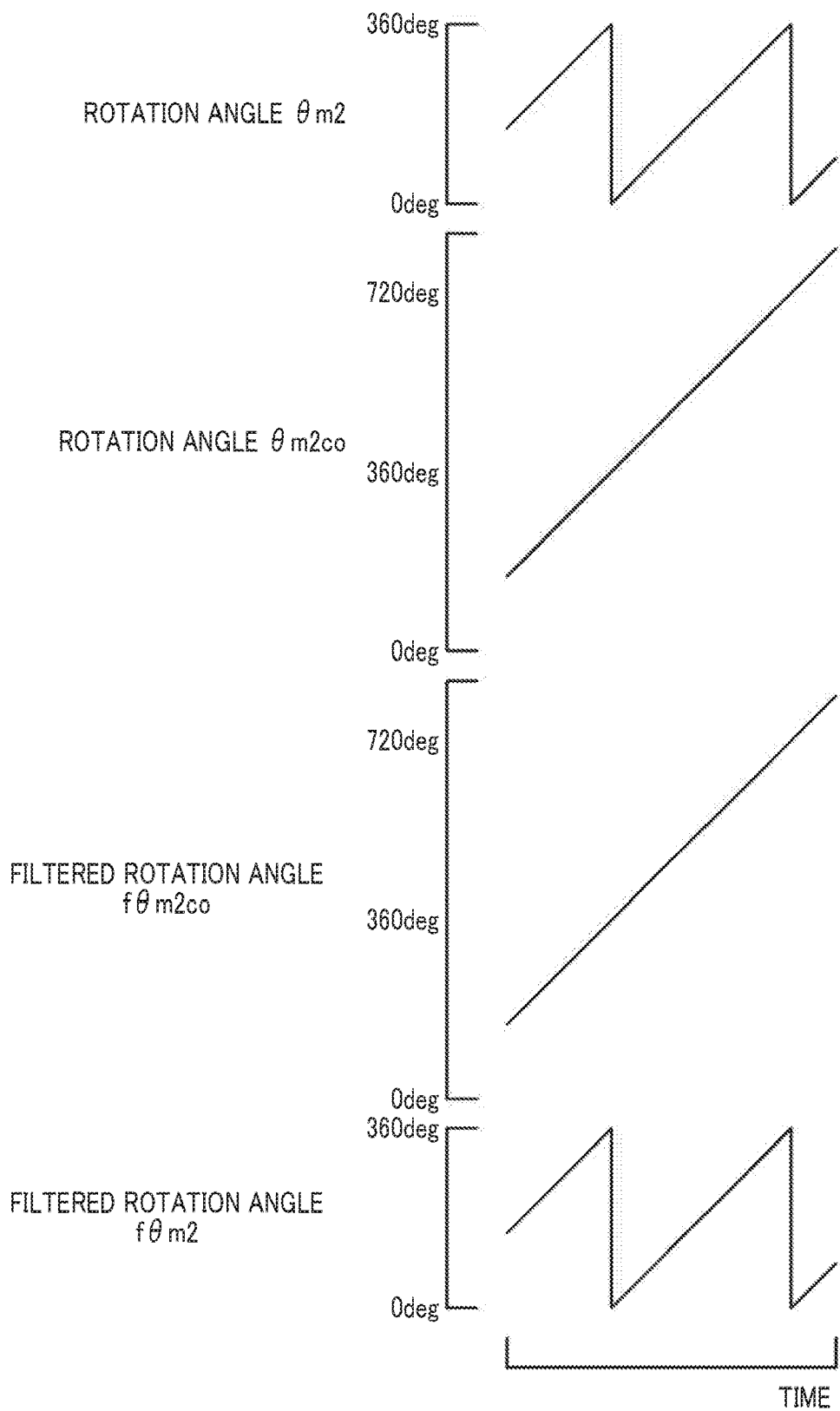
FIG. 9 is a graph showing a state in which a filtered rotation angle is generated in a drive device of a modification example.

In the electronic control unit 50C of the drive device 21C of FIG. 7, the filter unit 57 converts a slave rotation angle θm2 (a rotation angle that periodically changes within a range of 0 deg to 360 deg) of the motor 32 from the RD conversion unit 54 to a slave rotation angle θm2co (a rotation angle that continuously changes). The filter unit 57 subjects low-pass filter processing to the slave rotation angle θm2co to generate a filtered rotation angle fθm2co (a rotation angle that is filtered and continuously changes). The filter unit 57 converts the filtered rotation angle fθm2co to a filtered rotation angle fθm2 (a rotation angle that is filtered and periodically changes within a range of 0 deg to 360 deg) and outputs the filtered rotation angle fθm2 to the microcomputer 52. The reason that, instead of subjecting the slave rotation angle θm2 directly to low-pass filter processing to generate the filtered rotation angle fθm2, the filtered rotation angle fθm2 is generated from the slave rotation angle θm2 by way of the slave rotation angle θm2co and the filtered rotation angle fθm2co is as follows. FIG. 8 is a graph showing a state in which the filtered rotation angle fθm2 is generated in the former case (a comparative example). FIG. 9 is a graph showing a state in which the filtered rotation angle fθm2 is generated in the latter case (the modification example). In the comparative example, as shown in FIG. 8, the filtered rotation angle fθm2 becomes a value smoothed with respect to change of the slave rotation angle θm2 from 360 deg to 0 deg. In contrast, in the modification example, as shown in FIG. 9, it is possible to obtain an appropriate filtered rotation angle fθm2. The microcomputer 52 executes the diagnosis routine of FIG. 3 using the filtered rotation angle fθm2. Even with the configuration of the electronic control unit 50C, the filtered rotation angle fθm2 of the motor 32 has lower followability to the output signals from the resolvers 40, 45 than the master rotation angle θm1 of the motor 32.

In the drive device 21 mounted in the electric vehicle 20 of the example, as shown in the configuration diagram of a part of the drive device 21 of FIG. 2, the two resolvers 40, 45 are attached to the rotational shaft 32s of the motor 32. However, as shown in configuration diagrams of a part of drive devices 21D to 21G of FIGS. 10 to 13, solely one resolver 40 may be attached to the rotational shaft 32s of the motor 32.

Figure 10:
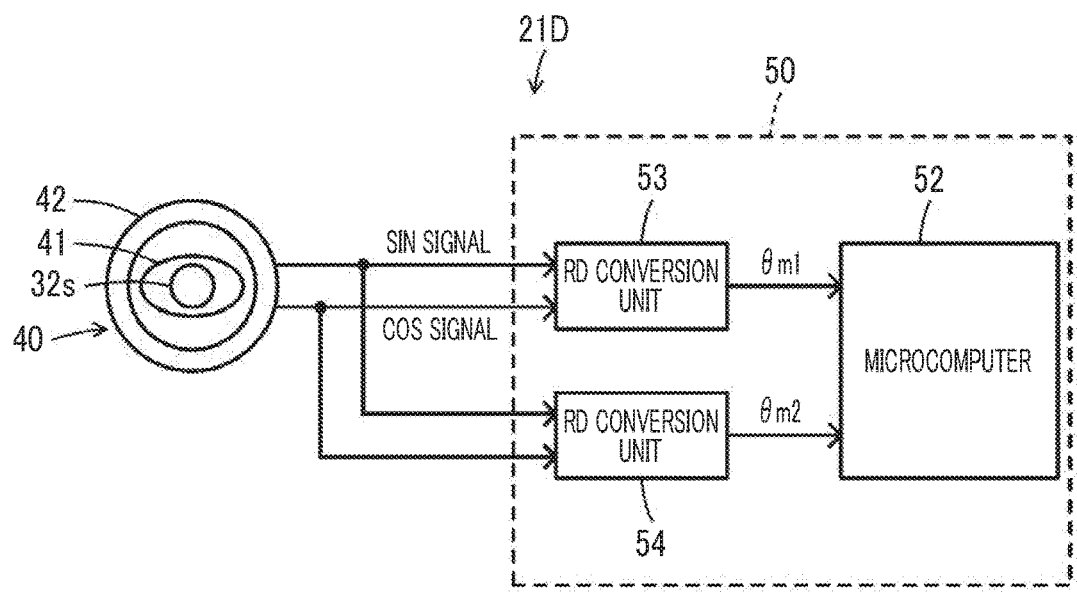
FIG. 10 is a configuration diagram showing the outline of the configuration of a part of a drive device of a modification example.

The drive device 21D of FIG. 10 corresponds to a configuration in which the two resolvers 40, 45 of the drive device 21 of FIG. 2 are changed to one resolver 40. In the drive device 21D of FIG. 10, the RD conversion units 53, 54 of the electronic control unit 50 convert the signals from the resolver 40 to the master rotation angle θm1 and the slave rotation angle θm2 of the motor 32 and output the master rotation angle θm1 and the slave rotation angle θm2 to the microcomputer 52.

Figure 11:
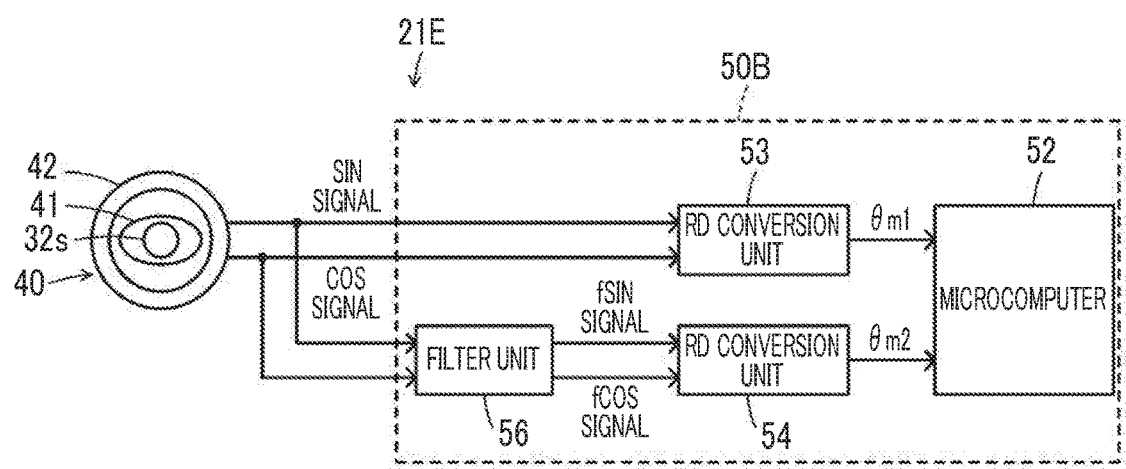
FIG. 11 is a configuration diagram showing the outline of the configuration of a part of a drive device of a modification example.

The drive device 21E of FIG. 11 corresponds to a configuration in which the two resolvers 40, 45 of the drive device 218 of FIG. 6 are changed to one resolver 40. In the drive device 21E of FIG. 11, the RD conversion unit 53 of the electronic control unit 50B converts the signals from the resolver 40 to the master rotation angle θm1 of the motor 32 and outputs the master rotation angle θm1 to the microcomputer 52. The filter unit 56 subjects low-pass filter processing to the signals from the resolver 40 to generate filtered signals and outputs the filtered signals to the RD conversion unit 54.

Figure 12:
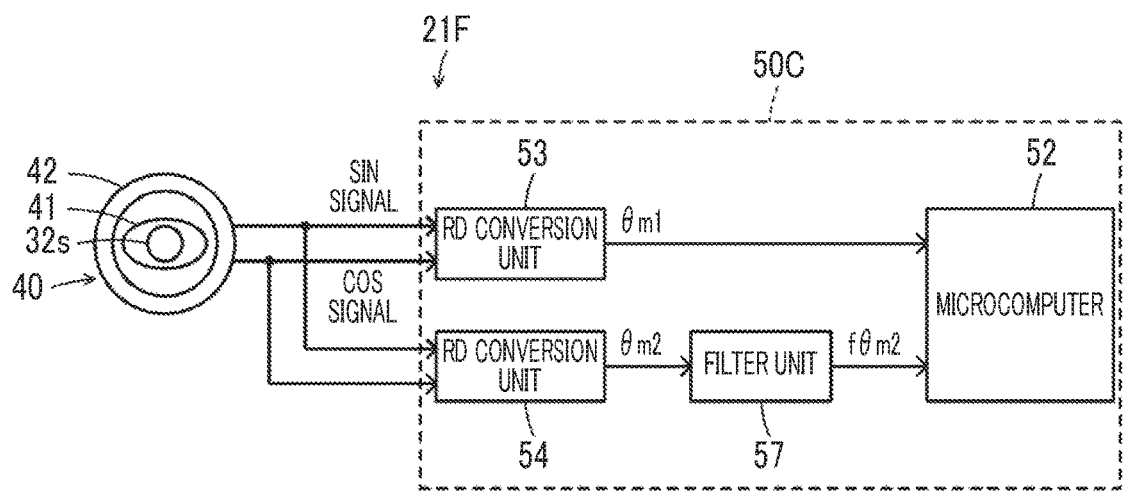
FIG. 12 is a configuration diagram showing the outline of the configuration of a part of a drive device of a modification example.

The drive device 21F of FIG. 12 corresponds to a configuration in which the two resolvers 40, 45 of the drive device 21C of FIG. 7 are changed to one resolver 40. In the drive device 21F of FIG. 12, the RD conversion unit 53 of the electronic control unit 50C converts the signals from the resolver 40 to the master rotation angle θm1 of the motor 32 and outputs the master rotation angle θm1 to the microcomputer 52. The RD conversion unit 54 converts the signals from the resolver 40 to the slave rotation angle θm2 of the motor 32 and outputs the slave rotation angle θm2 to the filter unit 57. In the electronic control unit 50C, the RD conversion units 53, 54 that are identical to each other (have the same proportional gain Kv as the value Kv1) are used.

Figure 13:
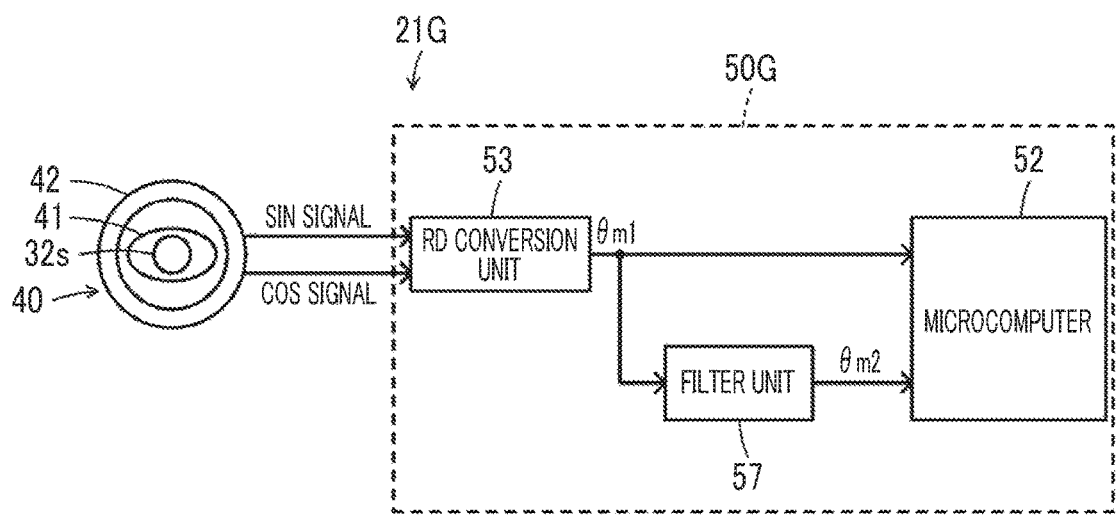
FIG. 13 is a configuration diagram showing the outline of the configuration of a part of a drive device of a modification example.

The drive device 21G of FIG. 13 corresponds to a configuration in which the two RD conversion units 53, 54 of the drive device 21F of FIG. 12 are converted to one RD conversion unit 53. In the drive device 21G of FIG. 13, a filter unit 57 of an electronic control unit 50G converts the master rotation angle θm1 (a rotation angle that periodically changes within a range of 0 deg to 360 deg) of the motor 32 from the RD conversion unit 53 to a master rotation angle θm1co (a rotation angle that continuously changes). The filter unit 57 subjects low-pass filter processing to the master rotation angle θm1co to generate a filtered rotation angle fθm1co (a rotation angle that is filtered and continuously changes). The filter unit 57 converts the filtered rotation angle fθm1co to a filtered rotation angle fθm1 (a rotation angle that is filtered and periodically changes within a range of 0 deg to 360 deg). The filter unit 57 outputs the filtered rotation angle fθm1co as the slave rotation angle θm2 to the microcomputer 52. With the above configuration, since it is possible to reduce the number of RD conversion units, it is possible to achieve further simplification of a configuration or reduction in cost.

In the example, a form is made in which the drive device is mounted in the electric vehicle 20 including the motor 32. However, a form may be made in which a drive device is mounted in a hybrid vehicle including an engine in addition to the motor 32. A form may be made in which a drive device is mounted in a vehicle other than an automobile, or a moving object, such as a ship or an aircraft. A form may be made in which a drive device is mounted in a fixed facility, such as a construction facility.

The correspondence relationship between the primary components of the example and the primary components of the present disclosure described m "SUMMARY" will be described. In the example, the motor 32 is an example of a "motor", the inverter 34 is an example of an "inverter", the resolvers 40, 45 are an example of a "resolver", the RD conversion units 53, 54 are an example of a "conversion unit", and the electronic control unit 50 is an example of a "diagnosis unit". The electronic control unit 50 is also an example of a "controller".

The correspondence relationship between the primary components of the example and the primary components of the present disclosure described in "SUMMARY" should not be considered to limit the components of the present disclosure described in "SUMMARY" since the example is solely illustrative to specifically describe the aspects of the present disclosure described in "SUMMARY". That is, the present disclosure described in "SUMMARY" should be interpreted based on the description in "SUMMARY", and the example is solely a specific example of the present disclosure described in "SUMMARY".

Although the mode for carrying out the present disclosure has been described above in connection with the example, the present disclosure is not limited to the example, and can be of course carried out in various forms without departing from the spirit and scope of the present disclosure.

The present disclosure is usable in a manufacturing industry of a drive device, or the like.

What is claimed is:

1. A drive device comprising:
a motor;
an inverter configured to drive the motor with switching of a plurality of switching elements; and
a rotation angle detector configured to detect a rotation angle of the motor, the rotation angle detector including a resolver and an electronic control unit, wherein:
the resolver is attached to a rotational shaft of the motor and is configured to output a signal according to rotation of the motor;
the electronic control unit is configured to convert a signal from the resolver to a master rotation angle of the motor;
the electronic control unit is configured to convert a signal obtained by attenuating a high frequency component of a frequency higher than a predetermined frequency with respect to the signal from the resolver to a slave rotation angle of the motor; and
the electronic control unit is configured to determine that the master rotation angle is normal when a determination condition that a difference between the master rotation angle and the slave rotation angle is equal to or greater than a first threshold and a temporal variation as a variation of the master rotation angle per unit time is equal to or greater than a second threshold is not established, and determine that the master rotation angle is abnormal when the determination condition is established.

2. The drive device according to claim 1, wherein the electronic control unit is configured to determine that the determination condition is established when a proportion of a state in which the difference is equal to or greater than the first threshold and the temporal variation is equal to or greater than the second threshold is equal to or greater than a third threshold for a predetermined time, and determine that the master rotation angle is abnormal.

3. The drive device according to claim 1, wherein:
the electronic control unit is configured to convert the signal from the resolver to the master rotation angle using a first gain; and
the electronic control unit is configured to convert the signal from the resolver to the slave rotation angle using a second gain smaller than the first gain.

4. The drive device according to claim 1, wherein:
the electronic control unit is configured to convert the signal from the resolver to the master rotation angle using a predetermined gain;
the electronic control unit is configured to perform filter processing for attenuating the high frequency component with respect to the signal from the resolver to generate a filtered signal; and
the electronic control unit is configured to convert the filtered signal to the slave rotation angle using the predetermined gain.

5. The drive device according to claim 1, wherein:
the electronic control unit is configured to convert the signal from the resolver to the master rotation angle using a predetermined gain; and
the electronic control unit is configured to perform filter processing for attenuating the high frequency component with respect to the master rotation angle to generate the slave rotation angle.

6. The drive device according to claim 1, wherein the electronic control unit is configured to control the inverter using the master rotation angle in a case where the electronic control unit determines that the master rotation angle is normal, and control the inverter using the slave rotation angle in a case where the electronic control unit determines that the master rotation angle is abnormal.

* * * * *

UNITED STATES PATENT AND TRADEMARK OFFICE
CERTIFICATE OF CORRECTION

PATENT NO. : 10,483,882 B2
APPLICATION NO. : 16/019001
DATED : November 19, 2019
INVENTOR(S) : Shinjiro Ashida It is certified that error appears in the above-identified patent and that said Letters Patent is hereby corrected as shown below:

In the Specification

In Column 5, Line 14, after "transistors", delete "or the" and insert --of the--, therefor.

In Column 7, Line 59, delete "plaster" and insert --master--, therefor.

In Column 11, Line 23, delete "218" and insert --21B--, therefor.

Signed and Sealed this
Fourth Day of February, 2020

Andrei Iancu
*Director of the United States Patent and Trademark Office*